United States Patent [19]

Wandell et al.

[11] Patent Number: 4,648,051

[45] Date of Patent: Mar. 3, 1987

[54] COLOR IMAGING PROCESS

[75] Inventors: Brian A. Wandell, Palo Alto; Laurence T. Maloney, East Palo Alto, both of Calif.

[73] Assignee: The Board of Trustees of the Leland Stanford Junior University, Stanford, Calif.

[21] Appl. No.: 660,938

[22] Filed: Oct. 15, 1984

[51] Int. Cl.$^4$ .......................... G01J 3/50; G01N 21/00
[52] U.S. Cl. ..................................... 364/526; 356/402
[58] Field of Search ........ 364/526; 356/402, 404–406; 250/226; 358/22, 75, 81; 382/17

[56] References Cited

U.S. PATENT DOCUMENTS

| | | | |
|---|---|---|---|
| 2,540,797 | 2/1951 | Stearns, Jr. ...................... | 364/526 X |
| 2,542,564 | 2/1951 | Park ................................. | 364/526 X |
| 4,411,519 | 10/1983 | Togami ........................... | 356/406 X |
| 4,488,245 | 12/1984 | Dalke et al. ........................ | 364/526 |

Primary Examiner—William B. Perkey
Attorney, Agent, or Firm—Flehr, Hohbach, Test, Albritton & Herbert

[57] ABSTRACT

A method is disclosed to separate the effect of the ambient lighting from the effects of surface reflectance to better analyze the surface properties of materials. The method uses the data sensed by N+1 sensor classes to define a finite dimensional approximation of a surface reflectance function at each image point, and a finite dimensional approximation of the ambient light.

The ambient light reflected from a surface will cause a strength of response in the $k^{th}$ class of sensor, at position x, according to the formula $$\rho_k{}^x = \int E(\lambda) S^x(\lambda) R_k(\lambda) d\lambda$$

We assume that there are P classes of sensor, and we represent the responses of all the sensors at location x by a vector, $$\rho^x = (\rho_1{}^x \ldots \rho_p{}^x)$$

We use two approximating formulas, one to simplify the description of the ambient light and a second to simplify the description of the surface reflectance. These are $$E(\lambda) = \sum_{i=1}^{i=M} \epsilon_i E_i(\lambda)$$

$$S^x(\lambda) = \sum_{i=1}^{i=N} \sigma_i{}^x S_i(\lambda)$$

These approximating formulas permit us to characterize the light by the vector of weights $\epsilon = (\epsilon_1 \ldots \epsilon_M)$ and the surface reflectance at a point, x, by the vector of weights $$\sigma^x = (\sigma_1{}^x \ldots \sigma_N{}^x)$$

The relationship between the characterization of the surface reflectance, $\sigma^x$, and the sensor responses, $\rho^x = (\rho_1{}^x \ldots \rho_p{}^x)$ can be described by a matrix equation of the form $$\rho^x = \Lambda_\epsilon \sigma^x$$

where $\rho^x$ and $\sigma^x$ are vectors, and $\Lambda_\epsilon$ is a matrix whose entries depend only on the ambient light. Our algorithm describes a method for recovering the surface reflectance vectors, $\sigma^x$, and the lighting matrix, $\Lambda_\epsilon$, given only the sensor data information, $\rho^x$.

16 Claims, 3 Drawing Figures

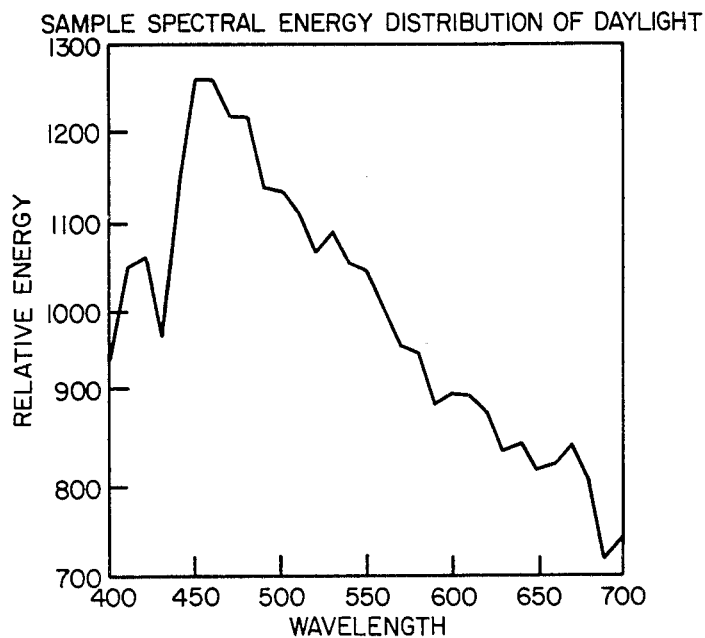
FIG_1
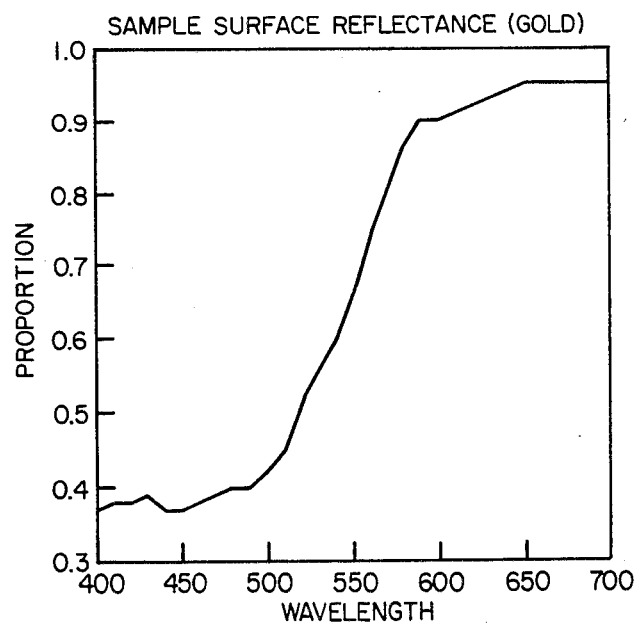
FIG_2

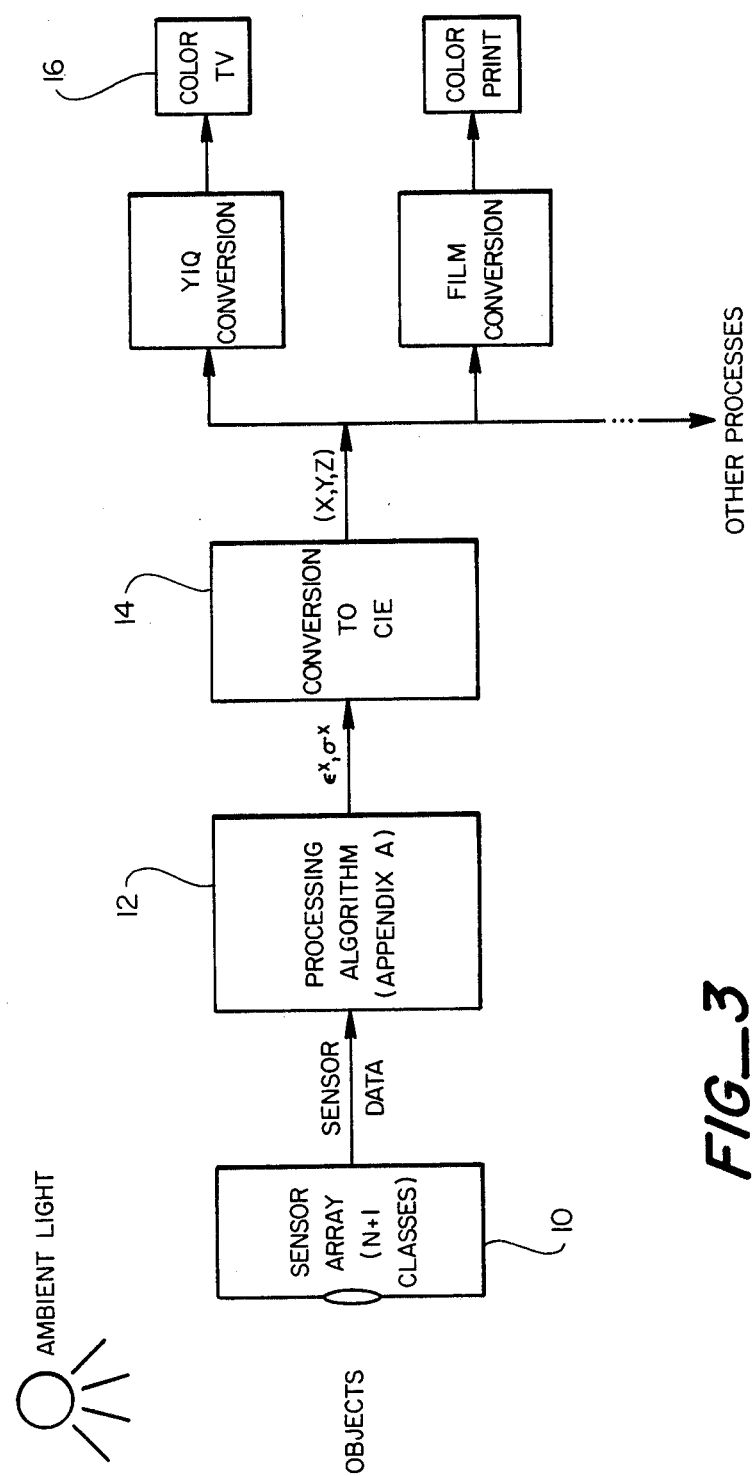

COLOR IMAGING PROCESS

The subject invention was developed under NIH grant 5-RO1-EY03164 and the government has a non-exclusive license for its own use hereunder.

This invention is directed generally to a method and system for measuring true color by estimating the spectral reflectance of surfaces, and relative spectral power of the ambient light. The method does not depend on specific prior knowledge of the ambient light or surfaces in the measured image.

Consider viewing a scene first in daylight and then under tungsten light. Despite a marked change in the spectral composition of the illuminating light, the human eye sees little change in the colors of objects in the scene. Man's perceptual ability to discount spectral variation of the illuminant and thereby maintain the appearance of object colors is called "color constancy." The mechanism by which color constancy is achieved remains the oustanding problem in the analysis of human color vision.

It is an objective of the present invention to sense the light reflected from the objects under study, separately calculate the spectral composition of the ambient light illuminating the objects, and then derive the surface reflectance of each object.

The ability to separate the effect of the ambient lighting from the effects of surface reflectance permits the construction of a number of devices that are of value in many different areas, including robotics (computer vision), photography, color measurement and matching, television, video cameras, video recorders, and color image processing and correction systems.

For example, robotics visual systems that wish to use surface spectral reflectance (i.e., color) to aid in object recognition and identification must be able to effectively discount any variation in the ambient light.

In particular, if a robot is to be trained to sort fruit, it must be able to study the fruit under full daylight, cloudy, or artificial lighting conditions, or a combination of the above, and accurately sort the fruit according to its surface properties, such as color, gloss, etc.

It is an objective of the present invention to provide a system and procedure which allows a robot a capability for accurately estimating surface reflectance properties of objects under study, despite incomplete knowledge of the ambient light.

A common problem in photography is that different types of film must be used for photography under different lighting conditions.

It is an objective of the present invention to provide a method of acquiring and/or processing color images, so that images photographed under one type of ambient light can be reconstructed as though they were shot under a different ambient light, thereby eliminating the need to use different films for different ambient light conditions.

Another problem in photography is that different filters must be used by photographers to accommodate different ambient lighting conditions.

It is an objective of the present invention to provide a method of buiding a light meter that can estimate the spectral properties of the ambient light, and use the results to advise photographers what type of color filter should be used on the camera to properly correct for the film loaded in their camera, or automatically to provide the appropriate color filter.

A related objective of the present invention is to provide an approach for incorporating sensors into optical cameras so that proper acquisition, recording, processing, correction and transmission of color images for television displays, video displays video recordings, and other outputs or displays can be carried out.

Another problem involving the perception of surface properties of materials has to do with the use of textile dyes, automobile paints, and the like. It is a common occurrence that different batches of dyes are used to color textiles, and objects such as car parts are painted using different batches of paint.

It is an objective of the present invention to provide a method and system for analyzing the spectral reflectance properties of different batches of paints and dyes to determine whether they will appear to match well under different ambient lighting conditions.

These and other applications depend on the ability to separate the effect of the ambient lighting from the effects of surface reflectance. The method described in the detailed description which follows uses the data sensed by $N+1$ sensor classes to define a finite dimensional approximation of a surface reflectance function at each image point, and a finite dimensional approximation of the ambient light. The algorithm is able to recover the coefficients that specify these approximations.

The fundamental physical components that play a significant role in the surface reflectance sensing method are (a) the ambient light, (b) the surface reflectances, (c) the sensors, and (d) the sensor responses.

We describe the ambient light in terms of how much energy is present at each wavelength. We call this function $E(\lambda)$, where $\lambda$ represents wavelength of light. We assume the light is uniform across the scene, for the moment, but we show how to relax this assumption later.

We describe the surface reflectance in terms of the fraction of the incident light the surface reflects at each wavelength. We call this function $S^x(\lambda)$; where $\lambda$ represents wavelength of light and x refers to spatial position. We assume that the objects under study are opaque and perfectly diffusing (matte).

There are P independent classes (kinds) of sensors in a two-dimensional array. An image of the scene is formed on this array. We refer to the locations of lights, surface reflectances and sensor responses by the position, x, in the sensor array at which each has its effect, and not by their physical location in the scene. Each class is present in sufficient density in the sensor array to adequately recover the image from the samples taken by the sensors. We describe the sensor spectral sensitivity in terms of the fraction of incident light at each wavelength that is absorbed by the sensor. We call this function $R_k(\lambda)$ for the $k^{th}$ class of sensor.

The ambient light reflected from a surface will cause a strength of response in the $k^{th}$ class of sensor, at position x, according to $$\rho^x_k = \int E(\lambda) S^x(\lambda) R_k(\lambda) d\lambda$$

We assume that there are P classes of sensors, and we represent the responses of all the sensors at location x by a vector, $\rho^x = (\rho^x_1 \ldots \rho^x_p)$ We use two approximating formulas, one to simplify the description of the ambient light and a second to simplify the description of the surface reflectance. These are $$E(\lambda) = \sum_{i=1}^{i=M} \epsilon_i E_i(\lambda) \quad S^x(\lambda) = \sum_{i=1}^{i=N} \sigma_i^x S_i(\lambda)$$

These approximating formulas permit us to characterize the light by the vector of weights $\epsilon = (\epsilon_1 \ldots \epsilon_M)$ and the surface reflectance at a point, x, by the vector of weights $\sigma^x = (\sigma^x_1 \ldots \sigma^x_N)$ The relationship between the characterization of the surface reflectance, $\sigma^x$, and the sensor responses, $\rho^x = (\rho^x_1 \ldots \rho^x_p)$ can be described by a matrix equation of the form $$\rho^x = \Lambda_\epsilon \sigma^x$$

where $\rho^x$ and $\sigma^x$ are vectors, and $\Lambda_\epsilon$ is a matrix whose entries depend only on the ambient light. Our algorithm describes a method for recovering the surface reflectance vectors, $\sigma^x$, and the lighting matrix, $\Lambda_\epsilon$, given only the sensor data information, $\rho^x$. By recovery we mean specifically that in each region of the scene over which the ambient light is approximately uniform, we recover the light vector, $\epsilon$, except for an unknown multiplier, a, and correspondingly we recover estimates of the surface reflectance vectors up to the inverse of this unknown multiplier, $(1/a)\sigma^x$. Our recovery procedure specifies the relative spectral energy distribution of the ambient light, $aE(\lambda)$ and a corresponding set of reflectance functions $(1/a)S^x(\lambda)$. We require that there be at least as many sensor classes P, as there are degrees of freedom in the ambient light approximation (M). We require that there be more classes of sensors, P, than there are degrees of freedom in the surface reflectance approximation (N).

The invention will be described with respect to the following figures:

FIG. 1 illustrates the energy spectrum of light radiated from a known light source.

FIG. 2 illustrates the surface reflectance of a material at different wavelengths.

FIG. 3 comprises a block diagram of the elements of an exemplary system incorporating the present invention.

A description of the physical environment and its relation to the perception of color gives insight into the problem and the novel method disclosed herein to solve it. The objective of the method is to independently determine the ambient light in the scene under examination, then the surface reflectance of the objects.

FIG. 1 is a plot of the relative spectral energy distribution of a typical daylight, $E(\lambda)$.

FIG. 2 is a plot of the spectral reflectance (i.e., $[S(\lambda)]$ tendency to reflect light at different wavelengths) of a particular substance, gold.

The light reaching the eye from each object in the scene is then simply $E(\lambda)S^x(\lambda)$ where the superscript x refers to the location of the objects, image on the sensor array, and the values are derived from the curves of FIGS. 1 and 2.

The initial stage of color vision is the absorption of light by photoreceptors in the eye or optical sensor. Each kind of photoreceptor or sensor has a spectral sensitivity R to each wavelength of light and behaves essentially as a linear system. Different sensors will have a tendency to absorb different wavelengths at different parts of the physical spectrum. The excitation recorded by a photoreceptor of the k'th class is then $$\rho^x_k = \int E(\lambda) S^x(\lambda) R_k(\lambda) d\lambda$$

For example, it is generally accepted that the human eye contains four distinct photoreceptors, three of which are active in daylight (photopic) vision. At each location x, then, the information concerning color is reduced to three numbers, the excitations or "quantum catches" of the three photoreceptor classes at each location. These three numbers are determined by both the spectral distribution of the ambient light $E(\lambda)$ and the spectral reflectance $S^x(\lambda)$ of objects at each location.

The problem of the surface spectral reflectance estimation may be put as follows. The spectral reflectance at each location $S^x(\lambda)$ is unknown. At each location, we measure the P quantum catches $\rho^x_k$. We must develop a procedure that estimates the surface reflectance at each location, X, when the ambient light is unknown. If the ambient light $E(\lambda)$ never varied, then the quantum catches at each location (or some function of the quantum catches) could serve as an estimate. But the same surface may give rise to very different quantum catches under different ambient lights.

Intuitively the gist of our procedure can be understood as follows. After sampling s surfaces, sP values are known from the left hand side of the matrix equation. But sN+M values are unknown on the right hand side of the equation. The number of unknowns always exceeds the number of knowns when P is less than or equal to N. The underdeterminancy can be resolved if one uses at least P=N+1 linearly independent sensors to spectrally sample the image at each location. In this case, s(N+1) values are obtained on the left hand side of the equation so that after sampling at M independent locations or more, the equations become overdetermined and can be solved for both $\epsilon$ and $\sigma^x$.

Therefore, N+1 sensor classes will permit recovery of both the lighting parameters, $\epsilon$, and the surface reflectance parameters, $\sigma^x$, at each location.

The algorithm to accomplish the solution may be implemented as follows:

Step 1: Input the sensor data, $\rho^x$, from N+1 or more sensors at each spatial location. The possible set of data values are completely described by these P-dimensional vectors.

Step 2: If the finite-dimensional approximating formulas are precisely correct, then the observed data will fall within an N-dimensional subspace of the P-dimensional sensor space. An example of a subspace is the following. Suppose there are P=3 sensors and N=2 terms used to describe the surface reflectance function. Then the sensor data will cluster about a plane passing through the origin in the 3-space. We compute the N-dimensional subspace that best contains all of the observed data. The best-fitting N-dimensional subspace can be obtained in many ways. We use a variant on a principal components decomposition of the sensor data. The first N principal components determine the subspace desired.

Step 3: Knowledge of the axes that define the subspace defines a set of linear equations from which it is possible to compute the vector $\epsilon$ that describes the light that would generate data restricted to the best-fitting subspace, based on the approximation $$E(\lambda) = \sum_{i=1}^{i=M} \epsilon_i E_i(\lambda)$$

Step 4: Use the estimated ambient light vector to compute the values of the matrix $\Lambda_\epsilon$ that maps the vector representation of surfaces ($\sigma^x$) into the sensor data ($\rho^x$), using the approximation $$S^x(\lambda) = \sum_{i=1}^{i=N} \sigma_i^x S_i(\lambda)$$

Step 5: Given the values of the matrix, $\Lambda_\epsilon$, solve the linear equations in Step 4 to recover the surface reflectance $\sigma^x$ from the sensor data $\rho^x$ at each location, i.e., $$\rho^x = \Lambda_\epsilon \sigma^x$$

Actual software written to implement this invention is incorporated herein as Appendix A. The software is written to run under the S software system.

S is a software system that runs under Bell Laboratories UNIX operating system on a variety of hardware configurations. S runs primarily on VAX computers made by the Digital Equipment Corporation; the code in Appendix A is written for such a computer, specifically a DEC VAX/780, running the 4.2BSD UNIX operating system. S is available through AT&T Technology.

The number of parameters required to have adequate models of ambient lights and surfaces may often be rather small. What data is available concerning spectral reflectances suggests that only a small number of parameters are needed to model most naturally occurring spectral reflectances. Recall that the number of sensors needed to capture N components of reflectance is at least N+1. We take the fact that biological systems have evolved with a rather small number of sensors as an indication that the number of degrees of freedom required to adequately represent spectral reflectance functions may also be quite small.

In many natural images, the spectral composition of the illuminant varies with spatial location. The computation above can be extended in a straightforward manner to the problem of estimating and discounting a slowly-varying (spatial lowpass) ambient light. For such images, in each local region the ambient light is approximately constant. The algorithm may thus be applied to each such local region of the image.

The new formulation also specifies how to construct automatic sensor systems capable of discounting spectral fluctuations in the ambient lighting. Using the analysis provided here the design of such systems can be specially tailored to working environments where the range of surfaces and lights may be measured before sensing begins.

A block diagram of an illustrative system incorporating the present invention appears in FIG. 3. An array of sensors 10 is provided facing the object surfaces to be examined. At least one more sensor class need be provided than there are degrees of freedom in the surface reflectance elements to be examined. As discussed above, sensors might include a camera with N+1 sensors responsive to every point of interest on the object; N+1 emulsions on film; or other types of (N+1) sensor arrays. The collected data ($\rho^x$) is processed 12 to develop the values of $\sigma^x$ (surface reflectance) and $\epsilon^x$ (ambient light) needed to define every point on the surface in terms of both the surface spectral reflectance and the ambient light at each point on the object surface. With this information it is then possible, using conventional techniques of color science, to compute 14 the CIE (Committee Internationale d'Eclairage) color tristimulus coordinates that should be output on the display device 16 at each point. From the knowledge of these values, we may compute exactly what should be displayed on a wide variety of color display media or printing devices or systems. The method of converting from our parameter estimates to display coordinates has two steps: first, we describe how to compute the standard CIE color coordinates. Then we describe the relationship between these coordinates and various common displays.

The values of the surface reflectance vector $\sigma^x$ permit us to estimate the surface spectral reflectance at point x by $$S^x(\lambda) = \sum_{i=1}^{i=N} \sigma_i^x S_i(\lambda)$$

Similarly the vector $\epsilon$ defines an estimate of the ambient light, $$E^x(\lambda) = \sum_{i=1}^{i=M} \epsilon_i^x E_i(\lambda)$$

To compute the value of X in the CIE tri-stimulus color coordinate system, often called the X, Y, Z system, we need only to perform the following numerical integration:

$$X = \int_{380 \text{ nm}}^{780 \text{ nm}} E^x(\lambda) S^x(\lambda) x(\lambda) d\lambda$$

A precisely parallel computation, substituting $y(\lambda)$ and $z(\lambda)$, be made to compute Y and Z. The functions E and S are estimated by our procedure. The functions $x(\lambda), y(\lambda), z(\lambda)$ are defined by the CIE and their values are widely available. Table 3.2 in Wyszecki and Stiles (1967, *Color Science* published by John Wiley & Sons), incorporated herein by reference, contains the values of these functions.

The values X, Y, Z precisely determine the desired output color for any particular device in terms of an agreed upon international color standard devised by the CIE. In order to specify the exact values required for some particular display device, it is only necessary to translate CIE color coordinates into device dependent coordinates. For example, the color coordinate system defined by the United States National Television Standards Committee (NTSC) is called the Y,I,Q system. In order to drive a color television monitor 16 one can use a simple set of linear formulas, equivalent to a matrix multiplication, that converts X,Y,Z to Y,I,Q; given these values, it is well known in the art how to make the necessary conversions 14 to drive the television guns to display each point x on the television screen 16. The relationship between the values of Y,I,Q and X,Y,Z are specified by the matrix equation $$Y = 0.0X + 1.0Y + 0.0Z$$

$$I = 0.407X - 0.842Y - 0.451Z$$

$$Q = 0.932X + 1.189Y + 0.233Z$$

A table of conversions that are common between various color representations, including the values to convert from X,Y,Z, coordinate system to Y,I,Q we have just described, from Pratt's widely used book entitled *Digital Image Processing*, (John Wiley & Sons 1978) is incorporated herein by reference. Procedures for converting from X,Y,Z specifications to any conventional device used in color display technology, such as film, video recorders, etc.

Because our algorithm estimates both the surface spectral reflectance and the ambient light, it allows the user great flexibility during image display in any of these media. The user may represent the results veridically, by using only the actually estimated values to determine the actual display values. Alternatively, the user may wish to display the results as if they were measured under conditions that did not exist at the time of image acquisition. To accomplish the user may display the colors using a light, $E(\lambda)$, that is different from the actually obtained estimate of $\epsilon$. The resulting display will have the appearance of being acquired under the assumed ambient light conditions, which may be quite different from the conditions under which the image was actually obtained.

For example, if the image was acquired under diffuse tungsten light, the procedure permits a reconstruction of the image as if the image had been acquired under diffuse fluorescent light, sunlight, or any other desired ambient light.

Other modifications to the present invention may occur to a person of skill in the art who studies the subject invention disclosure. Therefore, the present invention is to be limited in scope only by the following claims.

Appendix A

```

#   Single Region Spectral Reflectance Estimation Algorithm
#   Larry Maloney, Unpublished Work,       9.17.84

#   Initialization

#   Set up constants and data structures prerequisite to
#   the algorithm

nL - 20     # number of locations
nE - 4      # dimension of light space
nS - 3      # dimension of surface reflectance space
nR - 4      # number of photoreceptors
# The identity matrix [nR X nR]
ident - matrix( c( 1, 0, 0, 0,
                   0, 1, 0, 0,
                   0, 0, 1, 0,
                   0, 0, 0, 1), ncol=4, byrow=T )
# The system lambdai: nE matrices each [nR X nS]
# The values lambda1 - lambda4 are based on
#   Ei   nE basis elements chosen to be the mean
#        and first three components of daylight across
#        as given in of Judd, MacAdam Wyszecki(1964).
#        Scaled to unit norm.

#   Sj   nS basis elements chosen to be the characteristic
#        vectors of the Munsell chips across the range
#        400-700nm inclusive at 10nm intervals as given
#        in Cohen(1964).
#        Scaled to unit norm.

#   Rk   nR sensor sensitivities based on the Smith-Pokorny
#        spectral sensitivities given in Boynton(1979)
#        Scaled to unit norm.
```

-continued
Appendix A

```

# The kj'th entry of lambdai is then sum ( Ei*Sj*Rk ).
tmp - matrix( read("lambda.system"), ncol=4, byrow=T )
lambda1 - tmp[ 1:4, 2:4]
lambda2 - tmp[ 5:8, 2:4]
lambda3 - tmp[ 9:12, 2:4]
lambda4 - tmp[13:16, 2:4]

#   Single Region Spectral Reflectance Estimation Algorithm
#   Larry Maloney, Unpublished Work,       9.17.84

#   Estimation

#   Given the quantum catches and the lambdai matrices
#   representing the operating characteristics of the
#   vision system, estimate the light vector epsilon
#   and the surface reflectance vectors sigma.

#   Assumed: nS+1 = nE = nR

# ESTIMATE EPSILON STAR

# Augment quantum catches rho by the same vectors with opposite
# sign. Perform a principle components decomposition to find
# best nS-space constrained to pass through origin to the
# data rho.

mirror - cbind( rho, -rho)
pr - prcomp(t(mirror))
# An orthonormal basis for best nS-space is the first nS columns
#   of pr.
# The last principal component is perpendicular to this best nS-space
# and serves as an estimates of epsilon star
epsperp - pr$rot[,nS+1]
# ESTIMATE EPSILON
# Compute delta matrix
delta - cbind( t(lambda1) %* epsperp, t(lambda2) %* epsperp,
    t(lambda3) %* epsperp, t(lambda4) %* epsperp)
eig - eigen( t(delta) %* delta )
epshat - eig$vectors[,1]
epshat - epshat/sqrt(sum(epshat 2)) # the normalized estimate
  of epsilon
    # epshat is determined up to a sign. For convenience in
    # evaluation choose sign to minimize angular discrepancy with
    # epsilon.
    if ( sum(epsilon*epshat)<0 ) epshat - —epshat
    #
    erreps - epsilon—epshat
    round(epsilon,5); round(epshat,5); round(erreps,5)
# Compute lambhat the estimated lambda sub epsilon
# Compute lambda sub epshat
lambda - epshat[1]*lambda1 + epshat[2]*lambda2 +
         epshat[3]*lambda3 + epshat[4]*lambda4
# ESTIMATE SIGMAs
sighat - reg(lambda,rho,int=F)$coef

#   Single Region Spectral Reflectance Estimation Algorithm
#   Larry Maloney, Unpublished Work       9.17.84

#   Generate test data for a single (constant light) region.

#   Choose random surface reflectances and lights
#   for test purposes.
#   Generate corresponding sensor quantum catches.

#   Perturb quantum catches with Gaussian error as
#   controlled by sdS, sdE to test robustness of
#   algorithm.

#   NB: sdS and sdE must be defined before execution.

# LIGHT
# Choose a random light vector and normalize it.
epsilon - rnorm(4)
epsilon - epsilon/sqrt(sum(epsilon 2))
# Compute lambda sub epsilon
```

-continued

Appendix A

```
lambda - epsilon[1]*lambda1 + epsilon[2]lambda2 +
    epsilon[3]*lambda3 + epsilon[4]*lambda4
# SURFACE REFLECTANCES
# choose random surfaces vectors sigma[nS,nL]
sigma - matrix( rnorm(3*nL),nrow=3)
# SENSOR QUANTUM CATCHES
# Compute the quantum catches and perturb them. Perturbations are
# Gaussian random variables. The values pertS correspond to
# Gaussian error with mean 0 and variance sdS  2 that is added
# to each sensor type at each point in the scene independently.
# The values pertE are Gaussian errors with mean 0 and variance
# sdE  2 added to each sensor class independently
# but the same errors are added at every location in the scene.

# The errors pertS correspond to errors introduced by the surfaces.
# The errors pertE correspond to errors introduced by the light.

pertS - matrix( rnorm(4*nL,0,sdS),nrow=4)
pertE - matrix(rep(rnorm(4,0,sdE),nL),nrow=4)

# Compute sensor quantum catches

#rho - lambda %* sigma + pertS + pertE # with perturbation
rho - lambda %* sigma                  # without perturbation
```

What is claimed:

1. A method of utilizing a computer to determine surface spectral reflectances of an object's illuminated surface, comprising developing signals representing the responses of at least N+1 sensor classes to said illuminated object, and operating on said signals to recover N parameters describing the surface reflectance of the illuminated object, the surface reflectance being described and recovered separately from parameters describing an illuminant of the object, N representing the number of components (degrees of freedom) of said surface reflectance of said object's surface.

2. A method as in claim 1 wherein the step of operating on said signals comprises the steps of analyzing the response of said sensor class according to the equation $$\rho^x{}_k = \int E(\lambda)S^x(\lambda)R_k(\lambda)d\lambda$$

the responses of all said sensors being represented by a vector $$\rho = (\rho_1 \ldots \rho_p)$$

the term $E(\lambda)$ representing the illumination of the object;
the term $S(\lambda)$ representing said surface spectral reflectance;
the term $R_k(\lambda)$ representing spectral sensitivity of each of said sensors in terms of the fraction of light incident upon each said sensor absorbed at each wavelength.

3. A method as claimed in claim 2 wherein illumination is computed in terms of a weighted sum of fixed basis illuminants $E_i(\lambda)$, wherein $$E(\lambda) = \sum_{i=1}^{i=M} \epsilon_i E_i(\lambda)$$

the computed vector $\epsilon$ describing the illumination of the surface.

4. A method as claimed in claim 2 wherein the surface reflectance of the surface under study is expressed as a weighted sum of basis spectral reflectance functions $$S^x(\lambda) = \sum_{i=1}^{N} \sigma_i{}^x S_i(\lambda)$$

wherein $r^x$ is the vector representation of the surface.

5. A method as in claim 2 wherein the analyzing step includes inputting the sensor data $\rho^x$ from said N+1 sensors to said computer programmed according to the equation of claim 2.

6. A method as in claim 5 including the step of providing an array of sensors facing said illuminated surface, wherein said sensor data is read in for a plurality of locations on said surface.

7. A system for determining the surface spectral reflectances and ambient light of an object, having N parameters representing the number of components of surface reflectance, comprising N+1 sensors responsive to light reflected from said object, means for reading the response of at least N+1 sensors to said illuminated object, and means for recovering N parameters describing the surface reflectance of the sensed object separately from the illuminant of the sensed object.

8. A system as claimed in claim 7 wherein the means for recovering comprises means for analyzing the sensor response according to the equation $$\rho_k = \int E(\lambda)S(\lambda)R_k(\lambda)d\lambda$$

the responses of all the sensors being represented by a vector $$\rho = (\rho_1 \ldots \rho_p)$$

the term $E(\lambda)$ representing ambient light on the object;
the term $S(\lambda)$ representing surface reflectance;
the term $R_k(\lambda)$ representing spectral sensitivity of each of said sensors in terms of the fraction of light incident upon each said sensor absorbed at each wavelength.

9. A system as claimed in claim 8 including means responsive to the sensors for recovering the illuminant of the sensed object in terms of a weighted sum of fixed basis illuminants $E_i(\lambda)$, wherein $$E(\lambda) = \sum_{i=1}^{i=N} \epsilon_i E_i(\lambda)$$

wherein the computed vector $\epsilon$ describes the illuminant of the surface.

10. A system as claimed in claim 8 including means for recovering the surface reflectance of the object in response to the output of the sensors as a weighted sum of basis spectral reflectance functions $$S^x(\lambda) = \sum_{i=1}^{i=N} \sigma_i{}^x S_i(\lambda)$$

wherein $r^x$ is the vector representation of the surface.

11. A system as in claim 7 including means for operating on the computed illumination vector $\epsilon$ and computing values of the matrix $\Lambda_\epsilon$ to map a vector representation of said surface $\sigma^x$ into said sensor data $\rho^x$ derived from said data.

12. A system for defining points x on a surface in terms of N parameters separately defining surface spectral reflectance and illumination of each of said points, comprising N+1 sensors responsive to light received from each said point on said object, means for providing data $\rho^x$ collected by said sensors to processing means for developing separate values representing surface reflectance $\sigma^x$ and illumination $\epsilon^x$ for each of said points x, means for generating an estimated illumination vector $\epsilon$ that would generate the data $\rho^x$ detected, means responsive to the means for generating the estimated ambient light vector for generating a matrix $\Lambda_\epsilon$ that maps a vector representation of the surface into the sensor data, the surface reflectance $\sigma^x$ thereby being recovered for each location x.

13. A system as in claim 12 wherein said N+1 sensors are N+1 emulsions on film.

14. A system as in claim 12 including means responsive to said recovered surface reflectance $\sigma^x$ for estimating surface spectral reflectance at point x by the relation $$S^x(\lambda) = \sum_{i=1}^{i=N} \sigma_i^x S_i(\lambda)$$

15. A system as in claim 14 including means responsive to said illumination vector $\epsilon^x$ for estimating illumination of said surface by the relation $$E^x(\lambda) = \sum_{i=1}^{i=M} \epsilon_i^x E_i(\lambda)$$

16. A system as in claim 15 including means for operating on said estimated surface spectral reflectance and said estimated illumination to generate a desired output color on a display device according to the relation $$X = \int_{380 \text{ nm}}^{780 \text{ nm}} E^x(\lambda) S^x(\lambda) x(\lambda) d$$

and calculating Y and Z by the same relationship, substituting $y(\lambda)$ and $z(\lambda)$.

* * * * *